(12) United States Patent
Wee

(10) Patent No.: US 9,897,700 B2
(45) Date of Patent: Feb. 20, 2018

(54) VEHICULAR RANGING SYSTEM AND METHOD OF OPERATION

(76) Inventor: Jay Young Wee, Woodbury, NY (US)

( * ) Notice: Subject to any disclaimer, the term of this patent is extended or adjusted under 35 U.S.C. 154(b) by 0 days.

(21) Appl. No.: 13/428,490

(22) Filed: Mar. 23, 2012

(65) Prior Publication Data

US 2012/0242972 A1 Sep. 27, 2012

Related U.S. Application Data

(60) Provisional application No. 61/467,445, filed on Mar. 25, 2011.

(51) Int. Cl.
| | | |
|---|---|---|
| *G01C 3/08* | (2006.01) | |
| *G01S 17/93* | (2006.01) | |
| *G01S 7/486* | (2006.01) | |
| *G01S 17/87* | (2006.01) | |

(52) U.S. Cl.
CPC .......... *G01S 17/936* (2013.01); *G01S 7/486* (2013.01); *G01S 17/87* (2013.01)

(58) Field of Classification Search
CPC ......... G01C 3/08; G01C 15/002; G01S 17/89; G01S 7/4817; G01S 14/42
USPC ..... 356/3.01–3.09, 4.01, 4.07, 5.01, 5.09, 9, 356/625
See application file for complete search history.

(56) References Cited

U.S. PATENT DOCUMENTS

| | | | | |
|---|---|---|---|---|
| 7,242,343 B1 * | 7/2007 | Woodell | ............... | G01S 7/41 342/26 B |
| 7,242,462 B2 * | 7/2007 | Huang | ............... | 356/27 |
| 7,589,825 B2 * | 9/2009 | Orchard et al. | ............. | 356/4.03 |
| 2006/0077052 A1 * | 4/2006 | Matsuoka | ............... | G01S 13/56 340/471 |
| 2007/0027583 A1 * | 2/2007 | Tamir | ............... | G06Q 30/0283 701/1 |
| 2007/0075280 A1 * | 4/2007 | Nakano et al. | ............ | 250/559.38 |
| 2007/0188734 A1 * | 8/2007 | Waquet | ............... | 356/4.01 |
| 2007/0288734 A1 * | 12/2007 | Luick | ............... | 712/237 |
| 2008/0169965 A1 * | 7/2008 | Minichshofer | ............... | G01S 13/931 342/70 |
| 2009/0125203 A1 * | 5/2009 | Lindqvist | ............... | B60W 10/06 701/96 |
| 2009/0254260 A1 * | 10/2009 | Nix et al. | ............... | 701/96 |
| 2010/0076709 A1 * | 3/2010 | Hukkeri | ............... | G01S 7/4021 702/94 |
| 2010/0205012 A1 * | 8/2010 | McClellan | ............... | G06Q 40/08 705/4 |
| 2011/0043814 A1 * | 2/2011 | Wilkinson et al. | ............... | 356/450 |
| 2012/0078501 A1 * | 3/2012 | Haleem | ............... | G01C 21/20 701/408 |

(Continued)

OTHER PUBLICATIONS

European Search Report, dated Jun. 20, 2012 for Application No. EP 12160948, 1 page.

(Continued)

*Primary Examiner* — Samantha K Abraham
(74) *Attorney, Agent, or Firm* — Norton Rose Fulbright LLP; Alexandre Daoust

(57) ABSTRACT

A vehicular object ranging system having a long-range sensor having a long-range field of view and a short-range sensor having a short-range field of view overlapping and exceeding said long-range field of view and having an angular resolution capability. The sampling rate of one of the long-range sensor and short-range sensor can be varied depending of the signal provided by the other.

11 Claims, 11 Drawing Sheets

(56) References Cited

U.S. PATENT DOCUMENTS

2012/0081544 A1    4/2012  Wee

OTHER PUBLICATIONS

R. H. Rasshofer and K. Gresser, Automotive Radar and Lidar Systems for Next Generation Driver Assistance Functions, Advances in Radio Science, 3, 2005, pp. 205-209 (5 pgs.), SRef-ID: 1684-9973/ars/2005-3-205, Copernicus GmbH 2005.

* cited by examiner

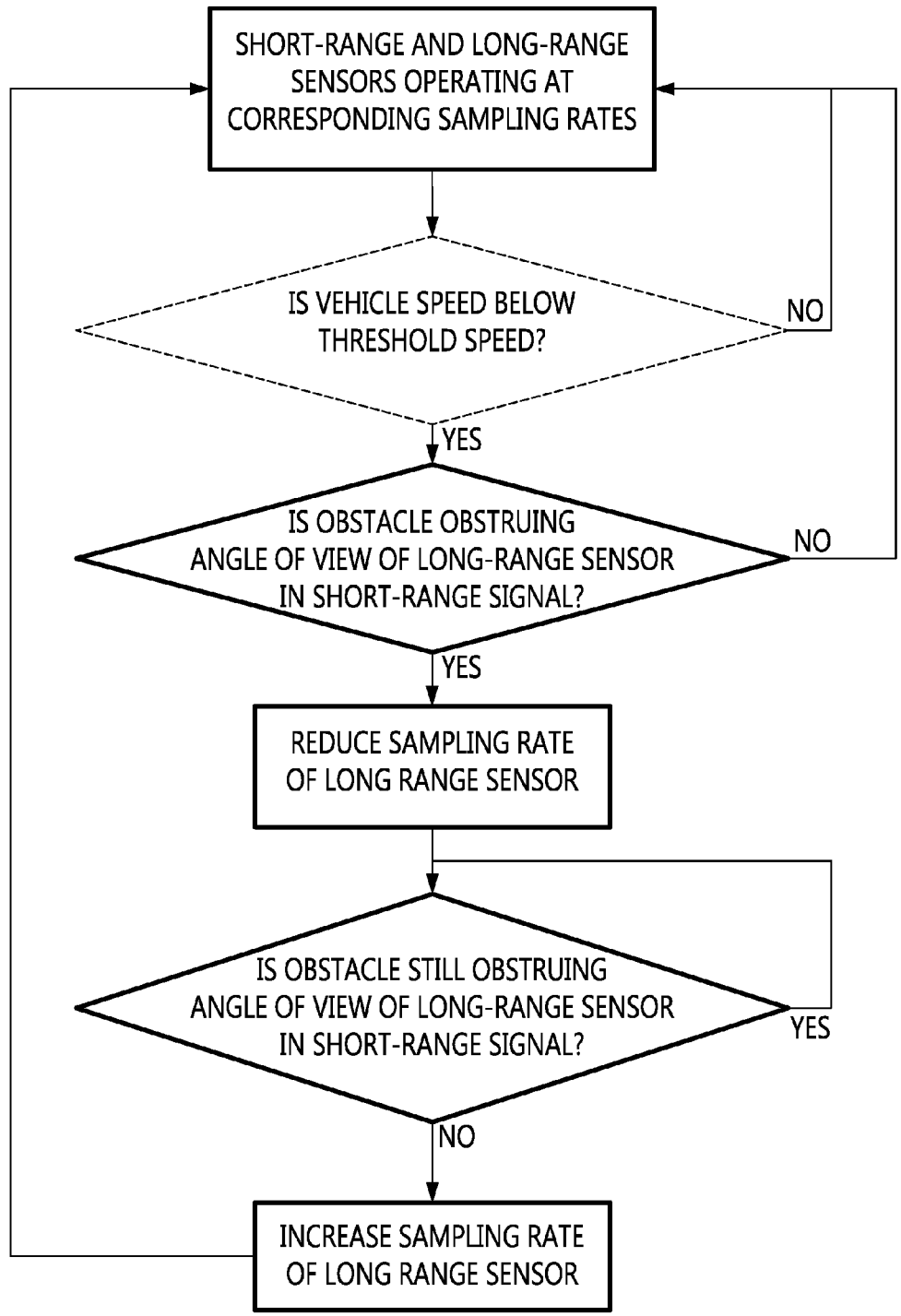

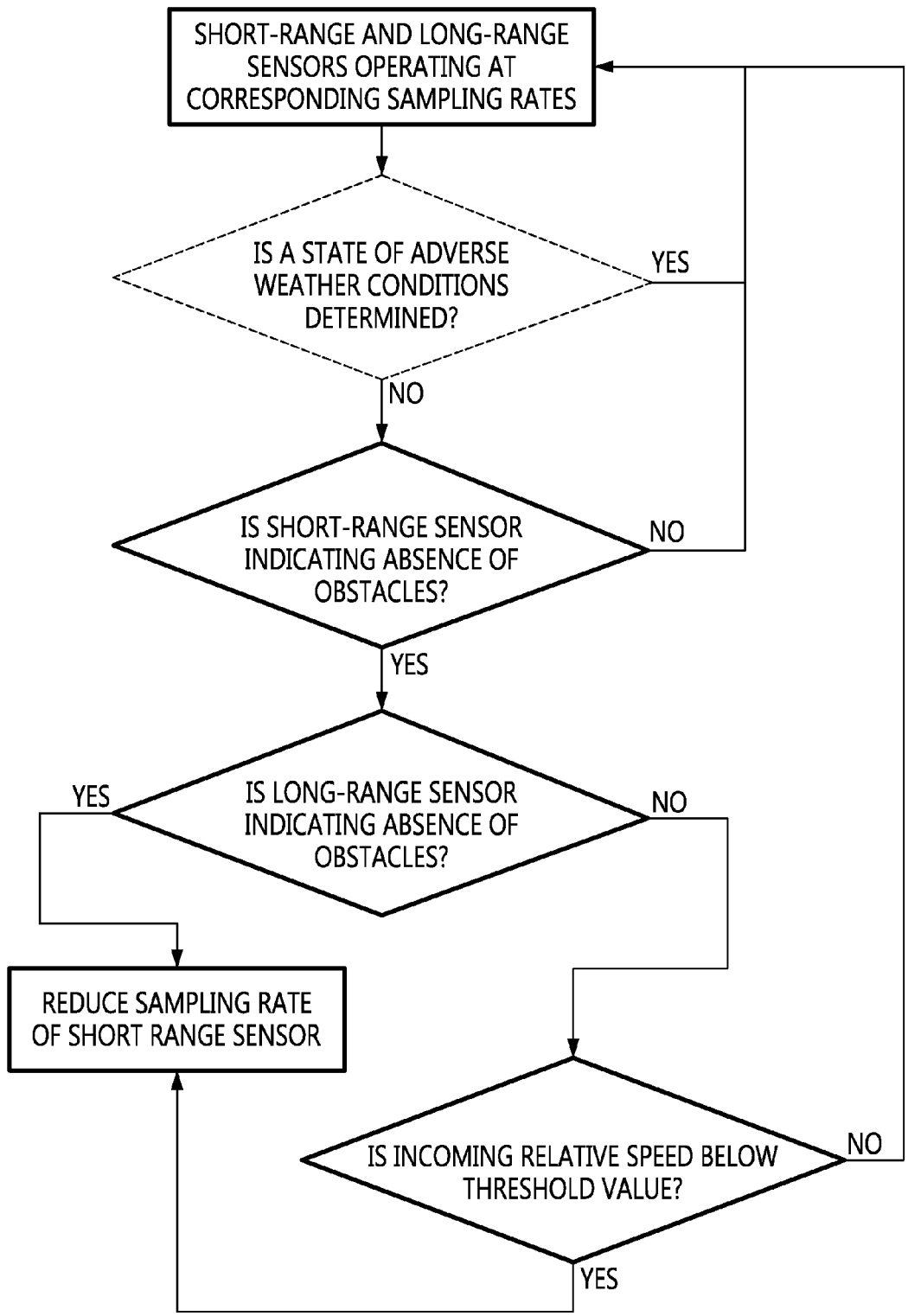

VEHICULAR RANGING SYSTEM AND METHOD OF OPERATION

PRIORITY CLAIM

This application claims priority from U.S. application No. 61/467,445 filed Mar. 25, 2011.

FIELD

The improvements generally relate to the field of vehicular perception systems for automotive vehicles, and more specifically relates to a vehicular object ranging system having both a short range sensor and a long range sensor.

BACKGROUND

Vehicular perception systems have been in development for several years, notably in automotive applications. It is known to use active sensors in such systems, which include both an emitter and a detector. An example of active sensors is LIDAR (LIght Detection And Ranging) technology, where a light signal can be emitted by a LED (Light Emitting Diode) or laser emitter (such as laser diode), for instance, and is later received by an associated detector. Although former systems were satisfactory to a certain degree, there remained room for improvement.

SUMMARY

In accordance with one aspect, it was found that for many applications, a wider field of view was required at short range than at longer range. Henceforth, instead of using a single active sensor with a wide field of view requirement to cover an entire range requirement, a combination of active sensors can be used. A shorter range sensor can be diffused over a wider field of view which can be required at shorter range, whereas a long range sensor can have its power concentrated over a narrower field of view to significantly reduce its power requirement compared to a sensor having the same range but a field of view meeting the shorter range field of view requirement.

Further, one significant concern of such systems was the durability of the components, or the mean-time between failures (MTBF). This was particularly the case for instance where the sensors used laser based emission, for instance, or other types of emitters having high costs.

It was found that the mean-time between failures could be improved in vehicular object ranging systems having a long-range lidar sensor having and a short-range lidar sensor by reducing the sampling rate of at least one of the sensors based on information provided by the sensors themselves, when certain conditions were met.

Henceforth, this application describes a method of modulation of the sampling frequencies of two complementary obstacle detection and ranging subsystems in order to reduce the number of emitted laser pulses required for the operation of said subsystems, thus increasing the lifespan of the laser emitters of the subsystems. Each of the subsystems having complementary obstacle range capability in order to meet the requirements of different obstacle detection situations. A short-range and wide field-of-view object detection and ranging subsystem system is typically required for collision mitigation systems in low-speed driving situations (typically, urban "stop-and-go" collision mitigation applications). A long-range and narrow field-of-view object detection and ranging subsystem system is also typically required for collision mitigation systems in high-speed driving situations (typically, highway or high-speed collision mitigation applications). The use of each of the subsystems can be considered exclusive in some driving situations. In those cases, using a feedback loop between the two obstacle detection and ranging subsystems, the sampling frequency of one of the subsystems can be reduced substantially (and in some cases, reduced to 0), while the frequency of the complementary subsystem is maintained at a normal operating frequency. In embodiments using laser emission for instance, the reduction of the sampling rate of the subsystems is expected to provide a reduction of the total pulses emitted by the laser sources of each subsystem. The number of laser pulses being one important factor in determining the MTBF of pulsed laser sources, the invention will increase the MTBF of each of the subsystems. The actual improvement on the MTBF of the laser-based subsystems will be dependent on other factors, such as the MTBF of all physical components of each subsystems as well as variations in the driving conditions in which the subsystems are used. Nonetheless, important improvement of the laser-based obstacle detection and ranging subsystems MTBF are expected.

In accordance with one aspect, there is provided a method of operating a vehicular object ranging system having a long-range laser LIDAR system having a long-range field of view and a long-range depth, and a short-range laser LIDAR system having a short-range field of view overlapping and exceeding said long-range field of view and a short-range depth smaller than said long-range depth, said method comprising operating one of said long-range sensor and said short-range sensor while simultaneously maintaining the other one of said long-range sensor and said short-range sensor in one of a reduced activation mode and an inactive mode.

In accordance with another aspect, there is provided a method of operating a vehicular object ranging system having a long-range sensor having a long-range field of view and a short-range sensor having a short-range field of view overlapping and exceeding said long-range field of view and having an angular resolution capability, said method comprising: operating the long-range sensor at a long-range sampling rate to generate at least one indication of one of an absence and a range of an object within said long-range field of view; operating the short-range sensor at a short-range sampling rate to generate at least one indication of one of an absence and a range of an object within said short-range field of view; and varying the sampling rate of one of the long-range sensor and the short-range sensor based on the at least one indication provided by the other one of the long-range sensor and the short-range sensor.

In accordance with another aspect, there is provided a vehicular object ranging system having a housing containing a long-range sensor having a long-range field of view and a long-range depth and a short-range sensor having a short-range field of view overlapping and exceeding said long-range field of view and a short-range depth smaller than said long-range depth, and a control module having a function to operate one of said long-range sensor and said short-range sensor while simultaneously maintaining the other one of said long-range sensor and said short-range sensor in one of a reduced activation mode and an inactive mode.

Many further features and combinations thereof concerning the present improvements will appear to those skilled in the art following a reading of the instant disclosure. For instance, in the case of each one of the long range and short range sub-systems, the depth signal can be combined to a color signal from a camera into a fused RGBD (Red, Green, Blue, Depth) or RGBID (Red, Green, Blue, Depth, Intensity) signal to become a power acquisition apparatus.

DESCRIPTION OF THE FIGURES

In the figures,

FIG. 11 is a flow chart showing variation of the sampling rate of the long-range sensor based on the output of the short-range sensor; and FIG. 12 is a flow chart showing variation of the sampling rate of the short-range sensor based on the output of the long-range sensor.

DETAILED DESCRIPTION

Figure 1:
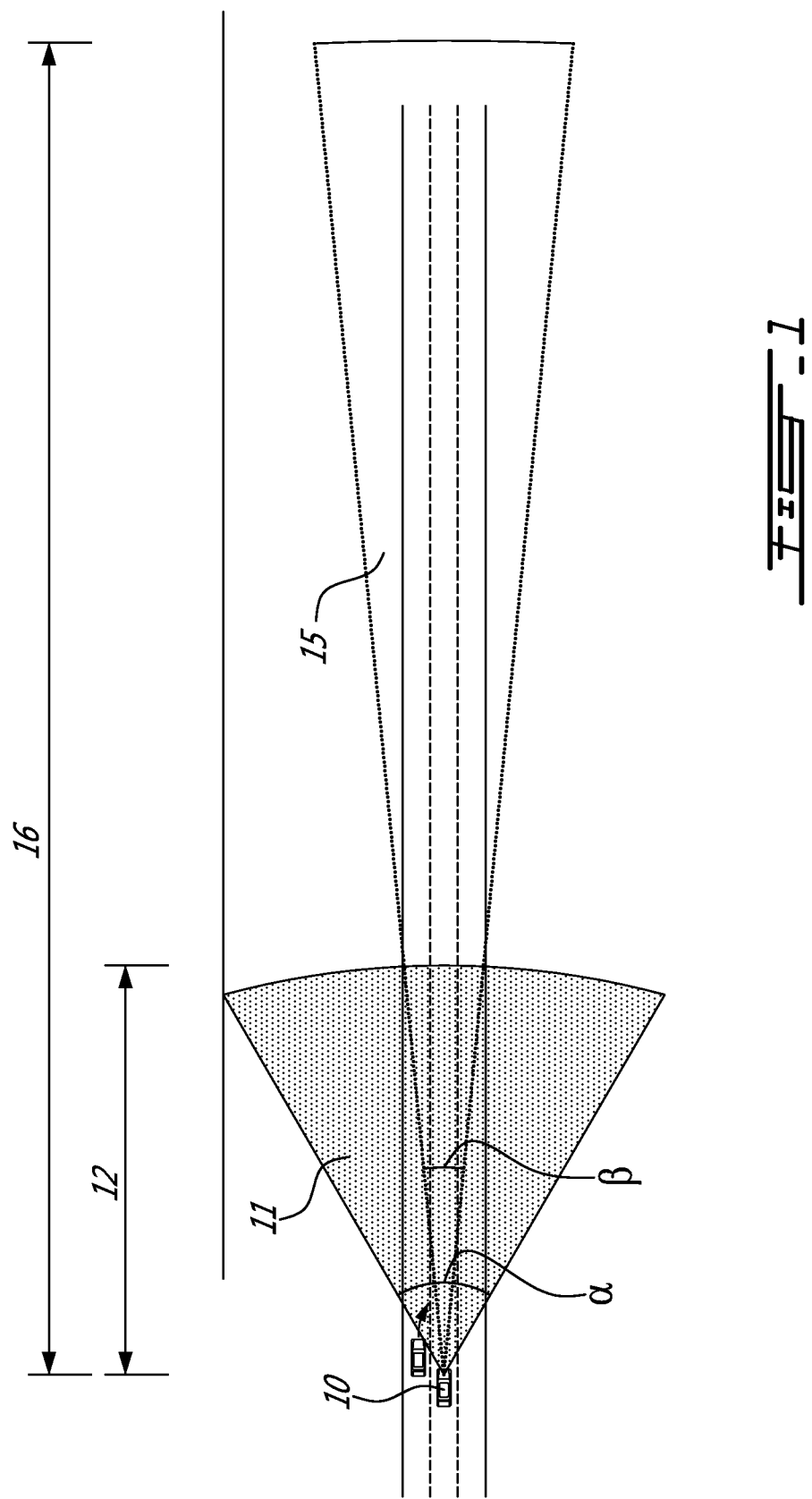
FIGS. 1 to 3 are schematic views of a first example of a vehicular object ranging system.

FIG. 1 shows an example of field of view and depth of view for an object ranging system of a vehicle 10, the object ranging system having two sensors subsystems, including a first sensor subsystem referred to as a short range sensor which has a short field of view 11 covering a horizontal angle α and a depth 12, and a second sensor subsystem referred to as a long range sensor having a long field of view 15 covering a narrower horizontal angle β but a greater depth 16. The two subsystems can be used independently for different road safety applications in this example. For instance, the short-range field of view 11 can satisfy the requirements of some low-speed collision avoidance applications, such as high-density traffic braking assistance systems for instance (examples of which are described later in the text), and can be adapted for the detection of some collision situations where the relative speed of the obstacle is relatively low, as in "cut-in" detection applications or lane change assistance applications (a cut-in scenario is shown in FIG. 1). On the other hand, the long range field of view 15 can be used for high-speed driving situations (such as on highways), to give sufficient reaction time to collision avoidance systems in high speed situations. The narrower field of view is selected to optimize usage of the system resources (such as emitter power or the angular resolution of detectors) to the region where obstacles are most likely to be detected in such driving situations.

It will be seen from the description below, that in this example, the output from one of the sensors can be used in determining an appropriate condition to reduce the sampling rate of the other sensor.

Figure 2:
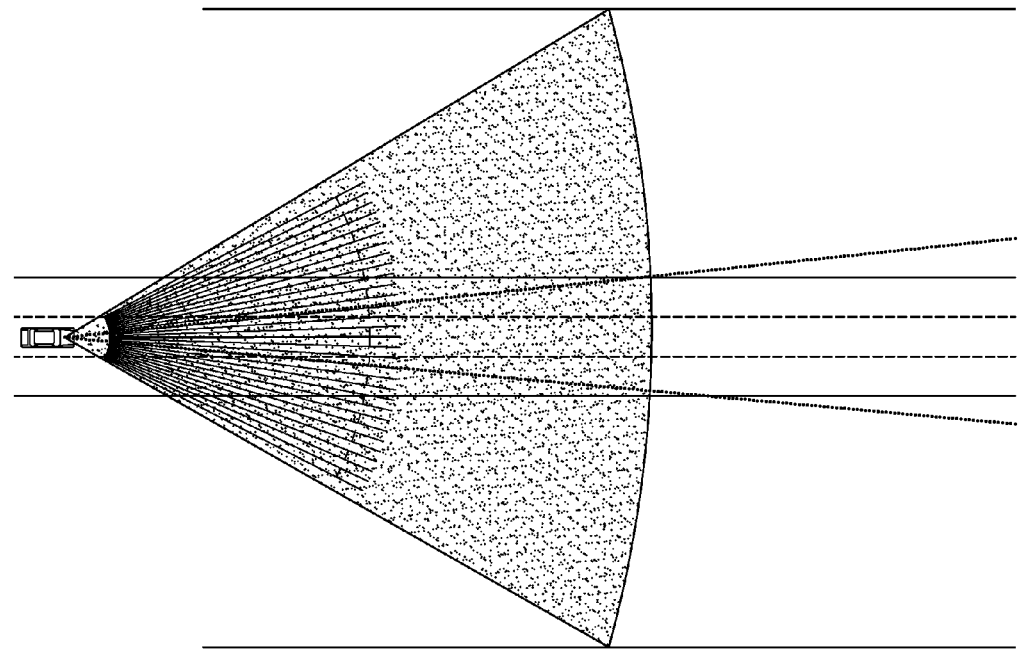
Figure 3:
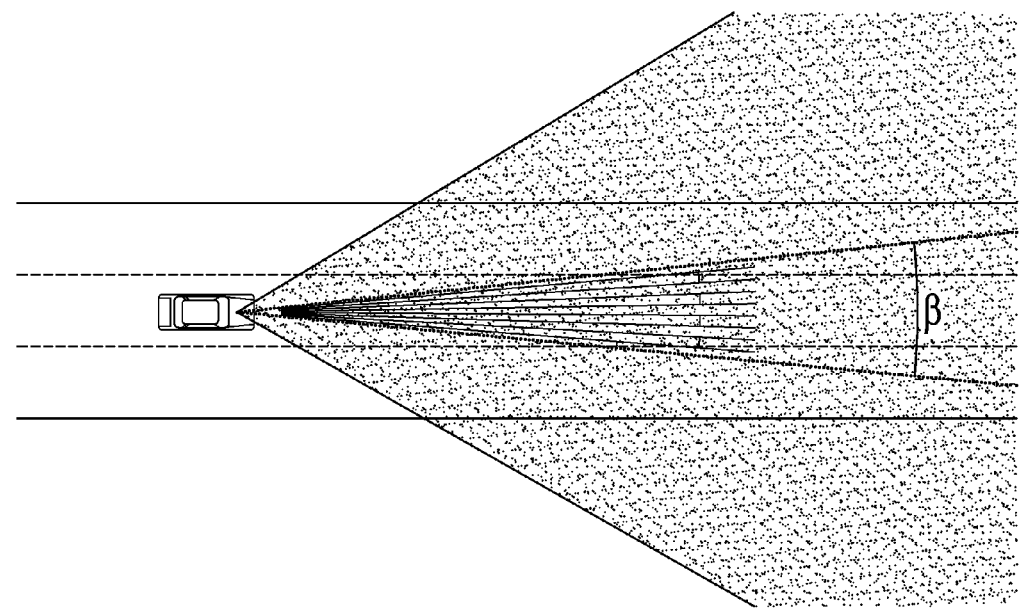

In one embodiment, both the short range sensor and the long range sensor are laser LIDAR subsystems having angular resolution capability. The short-range sensor field of view is more clearly shown in FIG. 2 as having emission and associated detection spanning a 60° field of view (i.e. 30° to each side in front of the vehicle), reaching a range of approximately 55 meters from the front of the vehicle, whereas the long-range sensor can be concentrated on an 11° field of view and can be used to sense 3 lanes wide in the range of between 50 and 150 meters. Alternative embodiments can have the short range sensor having a field of view between 40 and 80°, preferably between 50 and 70, and a range of 100 meters, preferably up to 70 meters, for instance and have the long range sensor having a field of view between 5 and 20°, preferably between 10 and 15, and a range of up to 200 meters, or up to 170 meters, for instance, for automotive applications. The short range lidar subsystem can have a 16×1, 32×1 or similar horizontally oriented array of detectors each covering a given angular span in the field of view for example. In the embodiment shown in FIG. 2, the individual angular span is of 1.8° for a 32×1 array. The long-range sensor can be linear mode FPA with configurations like 32×16 pixels concentrated on the narrower field of view. The angular resolution is optional especially for the long-range sensor. Having 32×16 type of FPA can be useful in the long range applications to determine the depth (volume) that can be translated detecting and understanding multiple vehicles if they are close proximity to each other. The angular resolution is optional and can be omitted in alternate embodiment, especially for the long range sensor. In FIG. 3, a long-range subsystem having a 8×1 array is shown with each individual sensor covering a 1.3° field of view.

Figure 4:
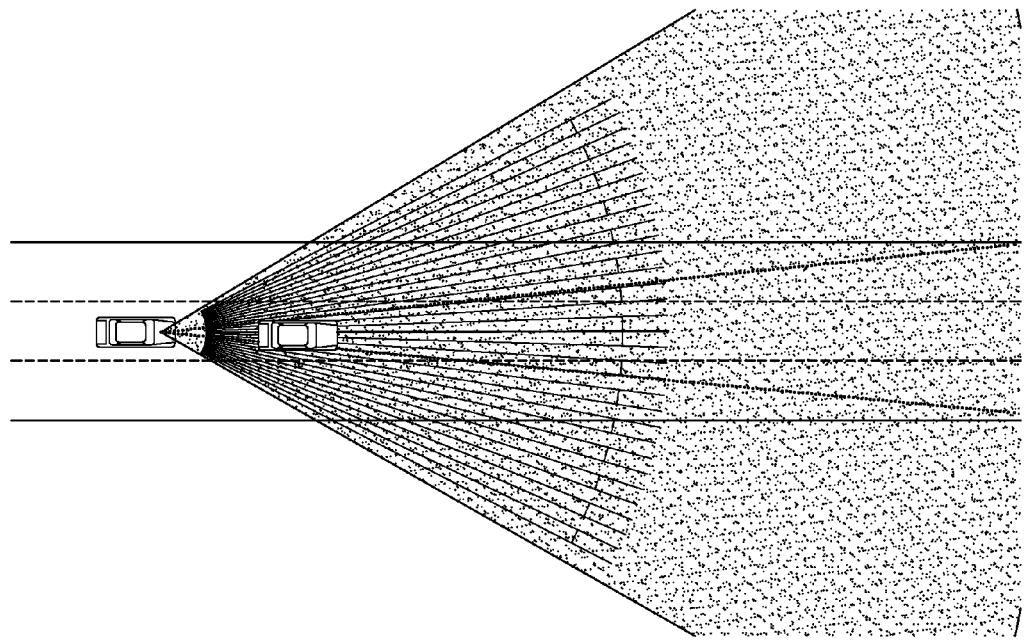
FIGS. 4 to 7 show different scenarios.

The two sensors can provide indications of different scenarios. For instance, in FIGS. 2 and 3, both sensors can provide an indication of absence of objects in the respective fields of view, which indication can be used to trigger a reduction in the sampling rate of the short range sensor, for instance. In FIG. 4, the short-range sensor can provide an indication that an object in the short range field of view, completely blocs the long-range field of view. This condition can trigger a reduction of the sampling rate of the long-range field of view, potentially down to zero, to thereby improve its mean-time between failure, for instance.

Many types of vehicular ranging systems include sensors which operate at given sampling rates, such as laser emission sensors, LED based lidars, or radars. Lasers and LED's are particularly susceptible to premature failure when compared to radars. The sampling rates can be regular or irregular. In the case of regular sampling rates, the expression "frequency" is used.

Figure 8:
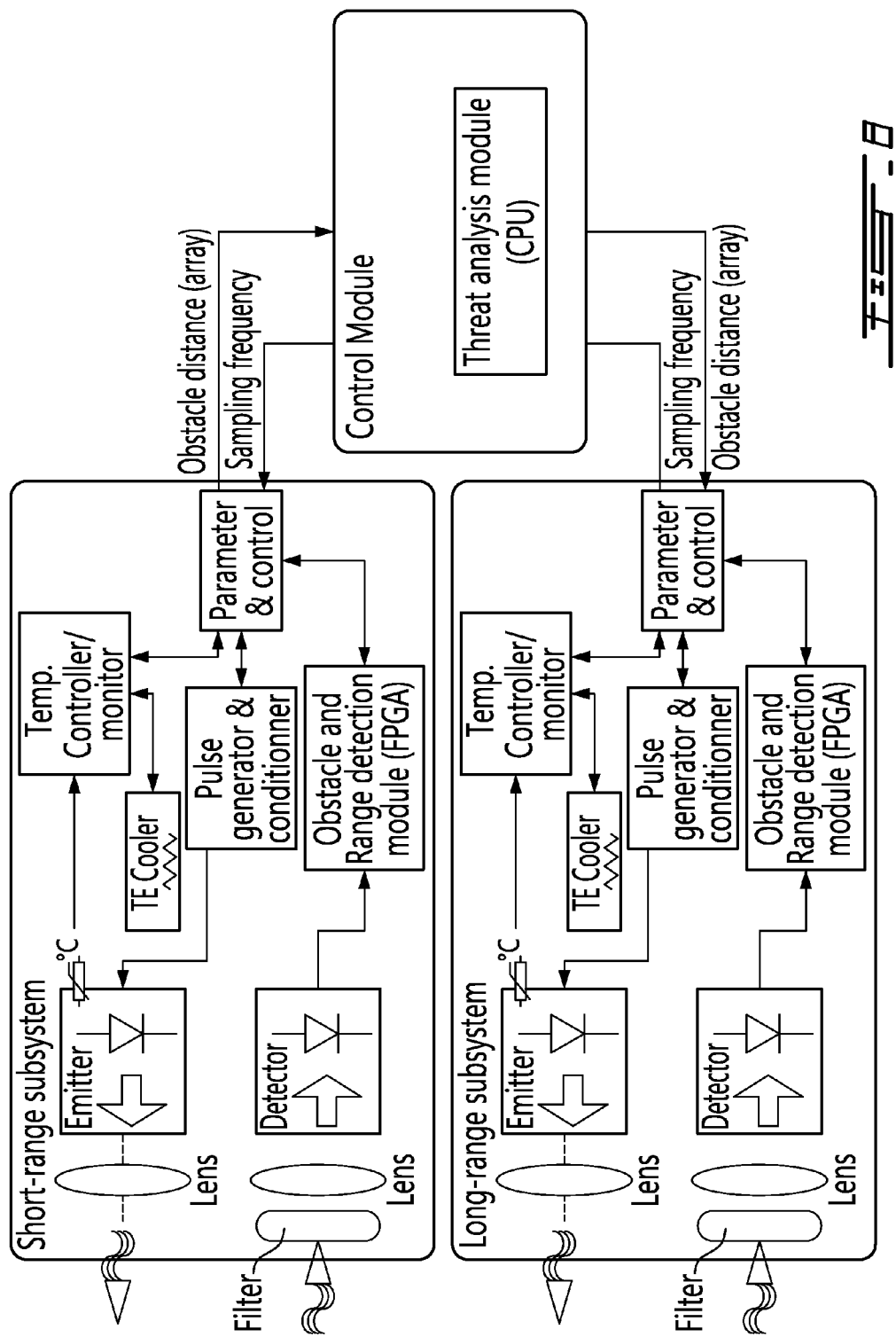
FIG. 8 is a block diagram of a proposed embodiment of a vehicular object ranging system.

FIG. 8 shows a functional block diagram of a proposed embodiment. This embodiment comprises a short-range (wide field of view) obstacle detection and ranging subsystem, a long-range (narrow field of view) obstacle detection and ranging subsystem and a control module.

In this embodiment, the short-range obstacle detection and ranging subsystem is composed of a laser emitter and accompanying optics and an optical detector with accompanying optics. The subsystem also contains a pulse generator used to periodically trigger the laser emitter in the generation of a pulse sequence, the periodicity of the pulse (or inversely, the related sampling frequency) of the pulse sequence being a controllable parameter. An obstacle and range detection module is used to interpret the optical detector input and translate it into actual identification of obstacles and range, providing identifiable characteristics of the obstacles (such as dimension) as a function of the capability of the detector, discussed further in the document. Additional support components, such as temperature monitoring and conditioning are also included in the subsystem. Finally, the subsystem contains a parameter and control module, used to obtain operation and control commands from the main control module and to ensure their proper application to the component modules of the subsystem.

In this embodiment, the detectors of the short-range obstacle detection and ranging subsystem is an arrayed detector, providing the capability to the subsystem of a fine angular resolution for obstacle detection within the field of view of the system. For example, using a linear array detector and a FOV of 60 degrees, the average coverage by detector "pixel" would be on average below 2 degrees.

In this embodiment, the long-range obstacle detection and ranging subsystem is configured in a similar fashion to the short-range, wide field of view obstacle detection and ranging subsystem. The differences between the two subsystems reside in the adaptations of the emitter and detector optics to the varying field of view, and in the use of different emitter wavelengths for each subsystem, with the subsequent adaptations of the emitter and detector optics and filters to the wavelength used by the subsystem. The long-range obstacle detection and ranging subsystem is able to provide the distance of the objects detected. The long-range obstacle detection and ranging subsystems can also optionally provide angular position and angular dimensions similar to those provided by the short-range subsystem.

The control module acquires, through communication with the parameter and control module of both subsystems, the obstacle identification of obstacles and range from both subsystems. Using rules (discussed further in the document), to assess the driving situation and determine the required usage of each of the subsystems, the Control Module instructs each of the subsystems on the recommended sampling frequency to be used.

In some embodiments, the pulse sequence generated by the pulse generator can be a single pulse. In other embodiments, the pulse sequence can be comprised of multiple pulses, evenly or unevenly spaced.

In this embodiment, the output beam can be diffused by a proper lens, in a way to cover an area of interest with a single pulse as opposed to scanning lasers for instance.

In some embodiments, the emitter and detector subsystems need not be based on laser emitters or optical receivers. The subsystems can be based on alternate obstacle detection and ranging technologies, such as radar or acoustic techniques. The nature of the subsystem does not impact on the potential for improvement on the MTBF using the sampling frequency modulation described as part of this invention.

Using the described architecture, the Control Module can implement hardware control of the sampling frequency of both subsystems in order to improve on the MTBF of the subsystem components as described below.

In the case where an object or multiple objects are detected by the short-range subsystem, within its detection range, and where said objects are known to have an combined angular dimension which covers totally the field of view of the long-range subsystem, the long-range subsystem sampling rate can be significantly reduced (and even shut down or placed in an other energy saving mode, if the embodiment permits). The sampling rate of the short-range subsystem can be kept at its maximal rate.

In this case, a total obstruction of the field of view of the long-range subsystem is assumed when either of the following conditions are met:

A single obstacle detected by the short-range detection subsystem is determined to obscure completely the long range detection subsystem's field of view (as per FIG. 4)

Figure 5:
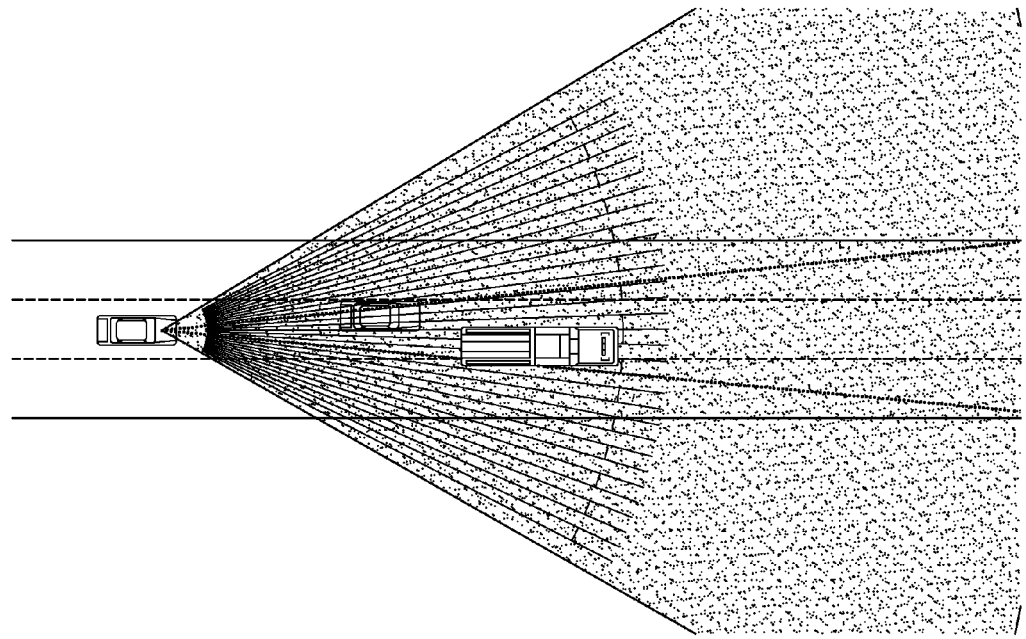

Multiple obstacles detected by the short-range detection subsystem are determined to obscure completely the long range detection subsystem's field of view (as per FIG. 5).

Figure 6:
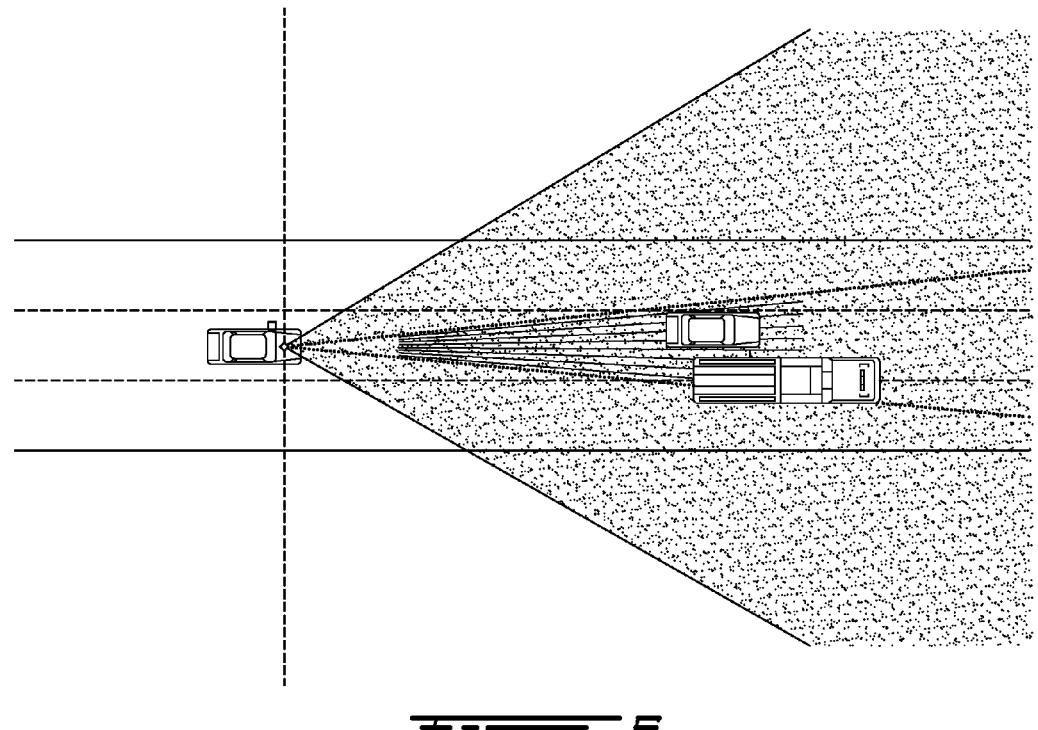

For concerning the latter, the calculated width of each identified object can be cumulated with a margin of error equivalent to the angular resolution of the long-range detection subsystem on each side of the object. For example, multiple obstacles detected by the short-range detection subsystem can be determined to obscure completely the long-range detection subsystem's field of view (as per FIG. 6) when the gap between obstacles is less than twice the angular resolution of the long-range detection subsystem. Also objects can be determined to exceed the long-range detection subsystem's field of view limits when they are within once the angular resolution of the long-range detection subsystem.

Figure 7:
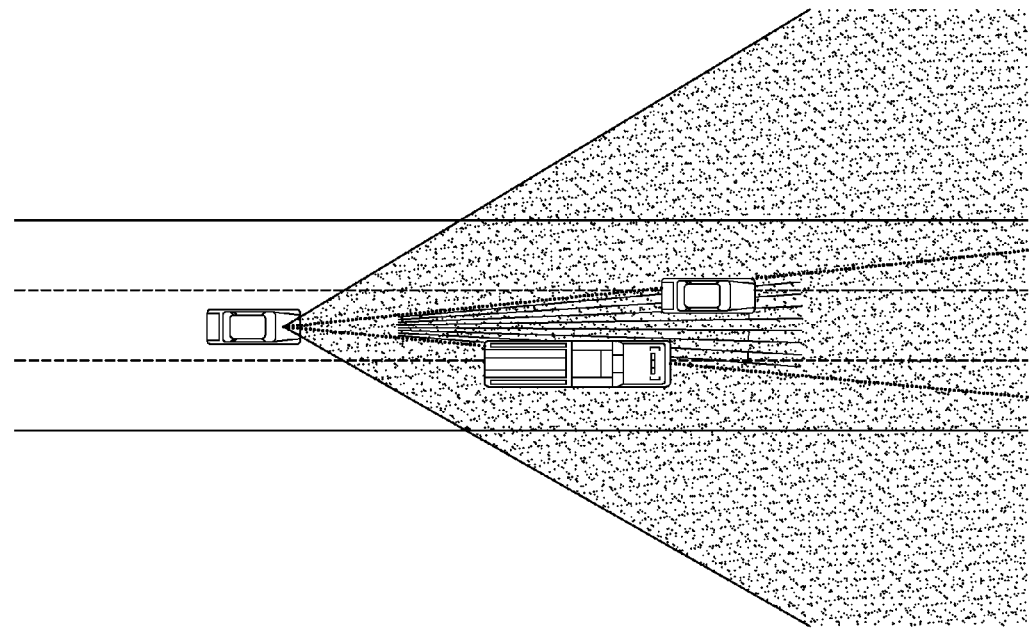

In the condition where multiple obstacles are detected by the short-range detection subsystem but where the gap between the objects exceeds or is equal to twice the angular resolution of the long-range detection subsystem (as per FIG. 7, for instance), it can be considered that the long-range detection subsystem should still operate, perhaps at a normal operation sampling rate.

In the case where an object is detected by the long-range subsystem, within its detection range but outside of the short-range subsystem, and where the short-range subsystem has no object within its detection range, and where the vehicle speed exceeds a minimum threshold (for example 60 km/h), the sampling rate of the short range subsystem can be reduced to a factor determined by the safety margins established for the embodiment.

In other cases, both subsystems should be operated at maximum sampling frequency.

The safety margin established by the embodiment can be proportional to vehicle speed, and detection range of the short-range subsystem with a set minimum threshold.

This last strategy is explained by the fact that, in high-speed driving situations, the short-range subsystem is usually used in support of the detection of vehicle "cut-in" situations, for collision avoidance and lane change assistance applications. In those cases, the relative speed of the obstacles is relatively low compared to the ego-motion of the vehicle.

A potential threat is the possibility of a head-on collision with an oncoming obstacle that is coming from outside the FOV of the long-range subsystem. In those cases, the reduction in sampling rate can be determined to have only a marginal effect on the reaction time. For instance, using a 55 meter depth of view for the short-range detection system, and an impending head-on collision of 2 vehicles, each with an ego speed at 100 km/h, In this case, relative speed between vehicles is 55 m/s. With a 100 Hz sampling rate, the distance a vehicle travels between samples is 0.5 m, while, with a 10 Hz sampling rate, the distance a vehicle travels is 5.5 m. This amounts to less than 1/10 of a second difference between both sampling rates.

Other embodiments may utilise other strategies.

Figure 9:
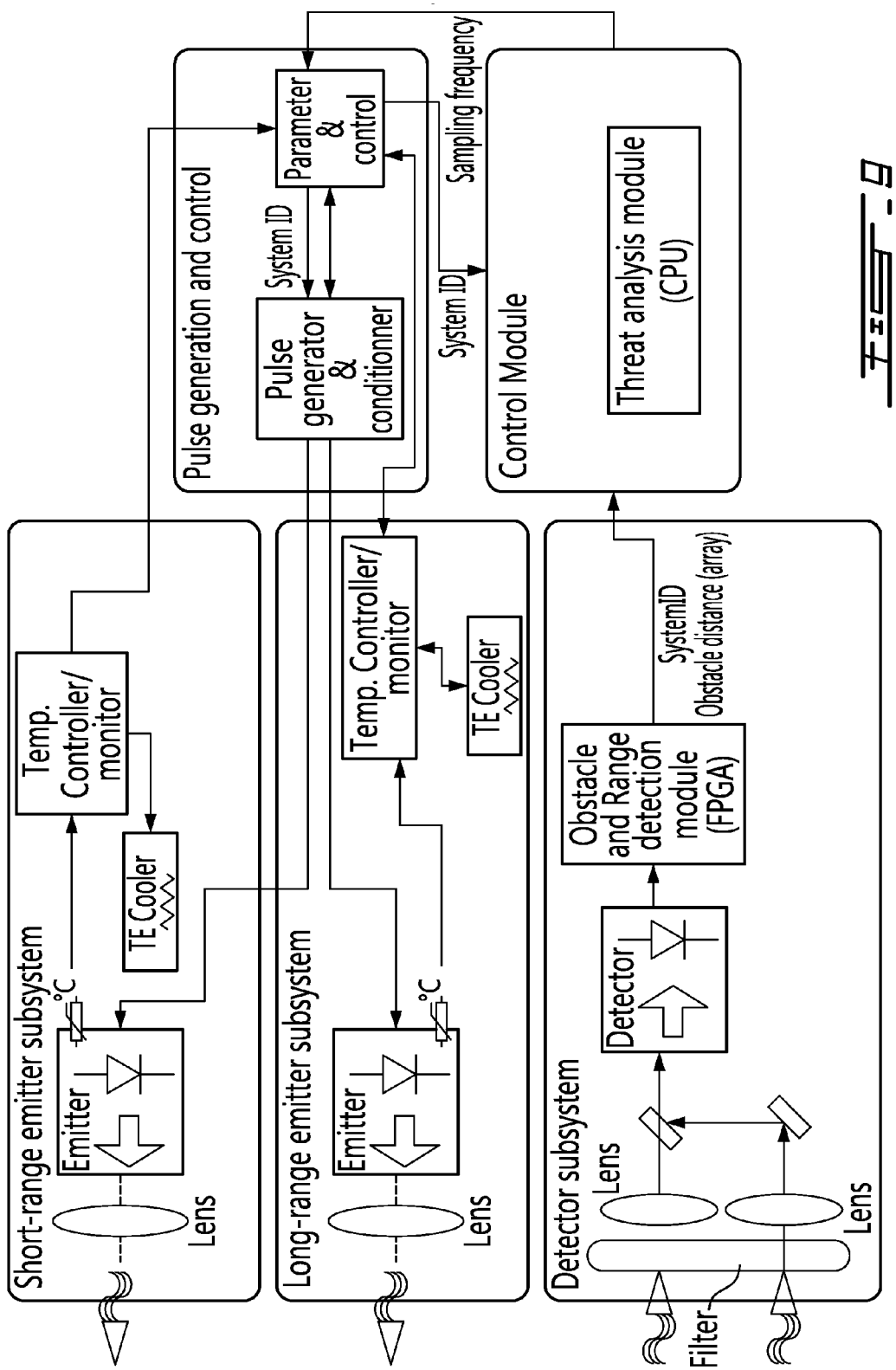
FIG. 9 is a block diagram of an alternate embodiment.

FIG. 9 describes another proposed embodiment of the invention where only the emitter portions of the short-range and long-range subsystems are distinct. In this embodiment, the receiver portion is common to both subsystems. This is accomplished by using emitters that use the same wavelength. The receiver optics is comprised of separate lenses to accommodate the different field of views, and the collimated beams at the receiver end are transmitted to a single optical receiver using optical devices to insert both beams in a single optical path. The pulse generator and conditioner module can alternately trigger each of the emitters sequentially, rather than simultaneously.

Figure 10A:
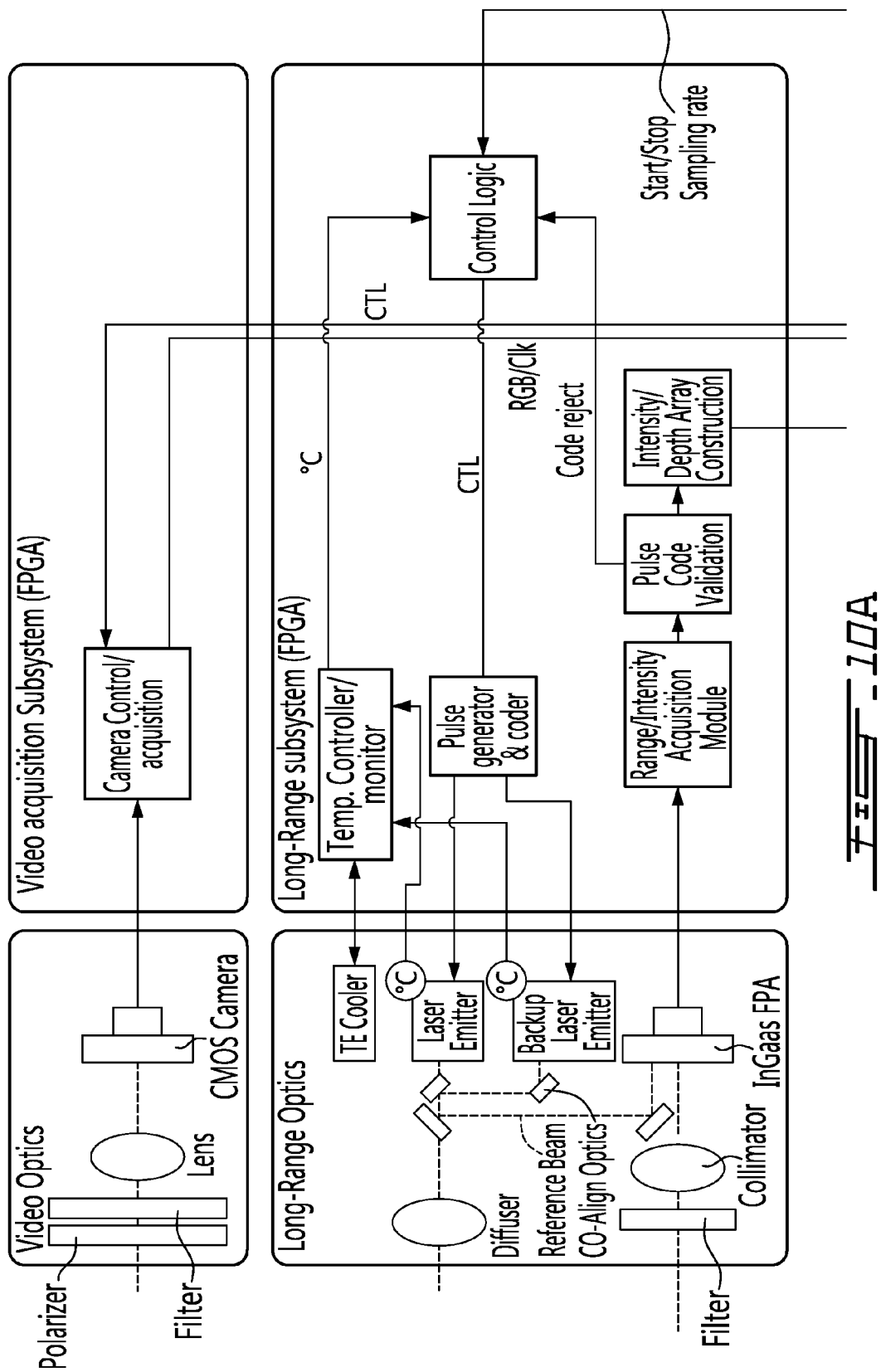
FIG. 10 is a block diagram of an example of a complete system.
Figure 10B:
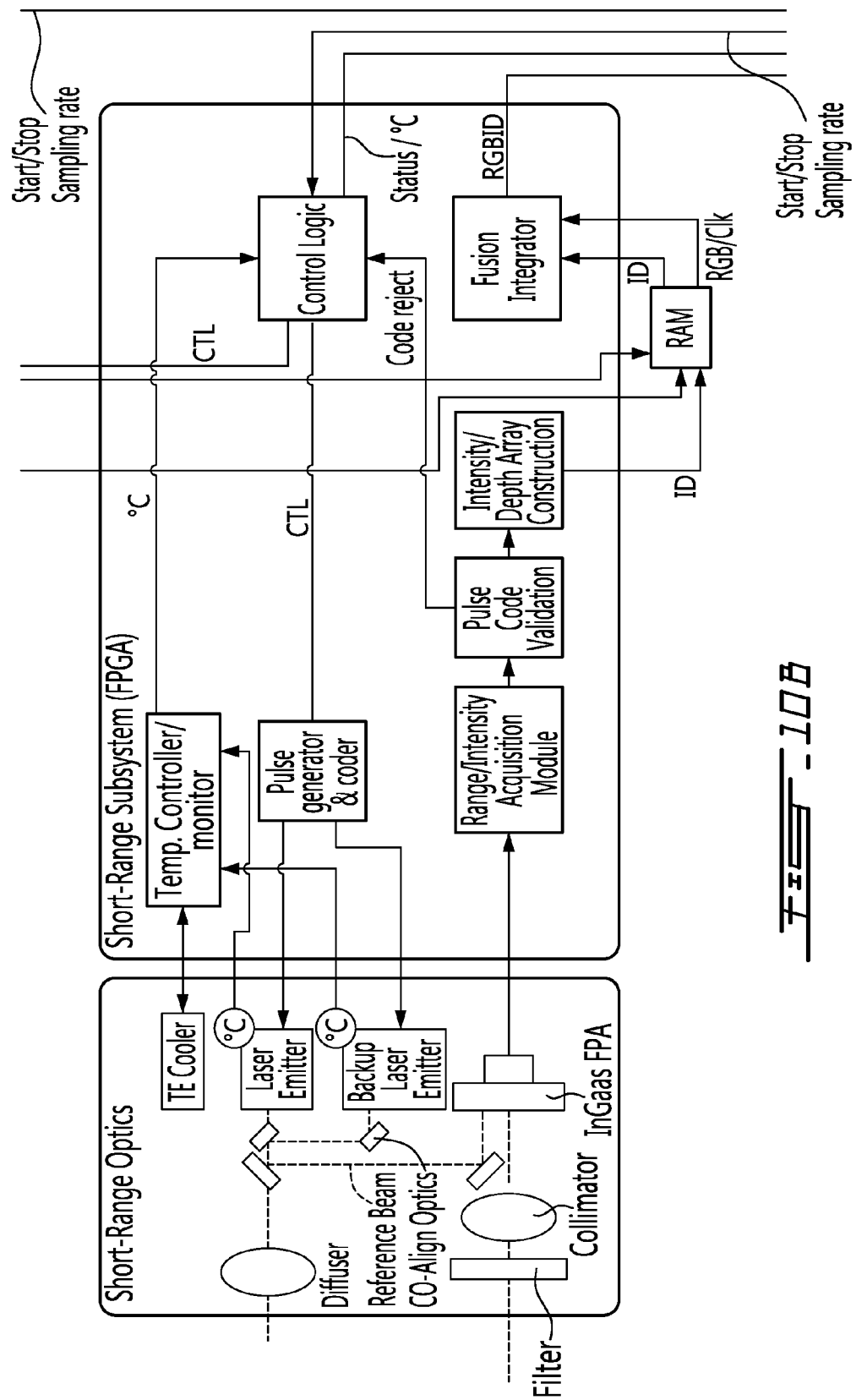
Figure 10C:
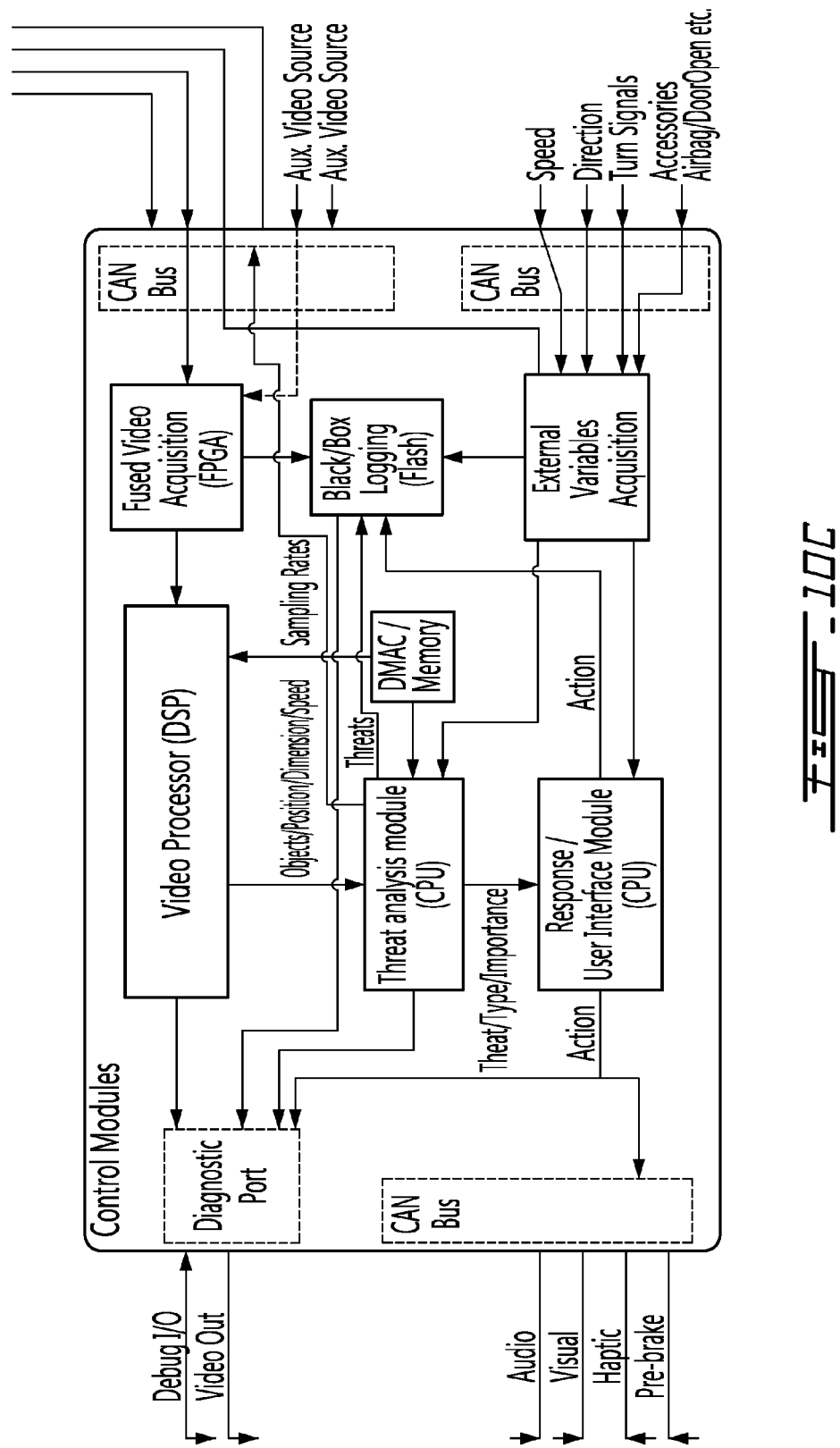

FIG. 10 describes a proposed embodiment with complementary details pertaining to the implementation within a complete automotive collision avoidance detector system. In this embodiment, independent short arrange and long range subsystems are implemented, using 3D Flash LIDAR technology. The functions performed by the Obstacle detection and Range detection Module of both subsystems are now performed in the Video Processor located in the Control Modules. The embodiment also incorporates a video acquisition subsystem and presents the interfaces of the sensor system to automotive platform components.

FIGS. 11 and 12 show simplified flow charts showing a method of operating the system. In FIG. 11, what is shown is an exemplary method for determining an appropriate condition for reducing the sampling rate of the long range sensor. Essentially, what is to be determined in this example is a condition likely indicating that the long-range sensor input is not of use, that is when one or more obstacles in the short range field of view are completely obstructing the long range field of view. When this is the case, at least a first condition for reducing the long range sensor sampling speed can be determined to be fulfilled. This scenario will typically occur at relatively low speeds, such as when the vehicle is stopped at a light or when the vehicle is driving slowly in dense traffic conditions, at which times it is safe to reduce the vigilance of the long-range sensor. Henceforth, in dotted lines, an additional condition is shown for this example: that the vehicle speed is below a given threshold value, which can be set to 15, 30, or 50 mph for instance, for the sampling rate of the long range sensor to be reduceable. Although not shown in the flow chart for the sake of simplicity, it will be understood that a vehicle speed condition can also be used to trigger increasing the sampling rate of the long range sensor back to a higher value.

In FIG. 12, what is shown is an exemplary method for reducing the sampling rate of the short range sensor. This can be the case for example when both the short range sensor and the long range sensor inputs do not indicate the presence of an obstacle. This is likely to happen at highway conditions for instance and so an optional minimal vehicle speed can also optionally be set as a condition (not shown in the flow chart for simplicity). Henceforth, in the case where both short range field of view and long range field of view are free from obstacles, the sampling rate of the short range sensor is reduced in this example. Also, as shown, even in the case where an obstacle is present in the long range field of view, but where this obstacle is determined from successive samplings of the long range sensor to have a relative speed with the vehicle which is either outgoing (i.e. moving away from the vehicle), or incoming at a relative speed below a threshold value. The threshold value of incoming relative speed can be established taking into account the distance of the obstacle and/or the speed of the vehicle for instance.

Further, although not necessarily shown in the flow charts for the sake of simplicity, it will be understood that there can be exceptions which prevent the reducing of the sampling rate although certain conditions are detected. This can be the case for example in adverse weather conditions for instance, where both long range sensor and short range sensor can be kept in a state of maximal alert for instance. Determining a state of adverse weather condition (such as direct sunlight, fog, rain, snow, etc.) can be done using an input from the sensors themselves, or from another subsystem for instance, such as a camera (e.g. CMOS) to name an example. Henceforth, the camera input, in embodiments where a camera is used, its signal can be used in determining whether or not reducing sampling rates is appropriate.

As can be understood from the discussion above and the various embodiments presented, the examples described above and illustrated are intended to be exemplary only. The scope is indicated by the appended claims.

What is claimed is:

1. A method of operating a vehicular object ranging system having a long-range sensor having a long-range field of view and a short-range sensor having a short-range field of view overlapping and exceeding said long-range field of view and having an angular resolution capability, said method comprising:
   operating the long-range sensor at a long-range sampling rate to generate at least one indication of one of an absence and a range of an object within said long-range field of view;
   operating the short-range sensor at a short-range sampling rate to generate at least one indication of one of an absence and a range of an object within said short-range field of view;
   varying the sampling rate of one of the long-range sensor and the short-range sensor based on the at least one indication provided by the other one of the long-range sensor and the short-range sensor;
   evaluating the relative speed of an object in the long range field of view based on at least two indications of range of an object of the long-range sensor; and
   comparing the relative speed of an object to an incoming speed threshold value;
   wherein the step of varying includes reducing the sampling rate of the short range sensor based on determining that the relative speed of an object is below the incoming speed threshold value.

2. The method of claim 1 wherein the long-range sensor is a long-range LIDAR system having a long-range depth, and the short-range sensor is a short-range LIDAR system having a short-range depth smaller than said long-range depth.

3. The method of claim 1 wherein the step of varying includes reducing the sampling rate of the long range sensor.

4. The method of claim 1 wherein the step of varying is further based on determining that a speed of a vehicle to which the vehicular object ranging system is integrated is one of above and below a given value.

5. The method of claim 1 wherein the step of varying is further based on determining a state of weather conditions which does not adversely affect an optical transmission.

6. The method of claim 1 wherein the step of varying includes reducing the sampling rate of the long range sensor based on the short range sensor generating at least one indication of a range of an object within said short-range field of view, said indication further including an indication that the object spans the long-range field of view.

7. The method of claim 6 wherein the step of varying is further based on determining that a speed of a vehicle to which the vehicular object ranging system is integrated is below a threshold value.

8. The method of claim 6 wherein said reducing includes stopping said operating of the long-range sensor while maintaining the sampling rate of the short range sensor at a given value.

9. The method of claim 1 wherein the step of varying includes reducing the sampling rate of the short range sensor based on an indication of absence of an object from both the short range sensor and the long range sensor.

10. The method of claim 1 wherein the step of varying includes reducing of the sampling rate of the short-range sensor based on the long-range sensor generating an indication of a range of an object and the short-range sensor generating an indication of an absence of an object in the short range field of view.

11. The method of claim 10 wherein said reducing is further based on an indication that a vehicle speed exceeds a given value.

* * * * *